(12) United States Patent  
Chen

(10) Patent No.: US 8,925,667 B2  
(45) Date of Patent: Jan. 6, 2015

(54) FALL-PROOF AND ANTI-COLLISION VACUUM CLEANER

(71) Applicant: Guozhang Chen, Yuyao (CN)

(72) Inventor: Guozhang Chen, Yuyao (CN)

(73) Assignee: Yuyao Jingcheng High & New Technology Co., Ltd., Yuyao, Zhejiang (CN)

( * ) Notice: Subject to any disclaimer, the term of this patent is extended or adjusted under 35 U.S.C. 154(b) by 14 days.

(21) Appl. No.: 13/687,326

(22) Filed: Nov. 28, 2012

(65) Prior Publication Data

US 2014/0014432 A1    Jan. 16, 2014

(30) Foreign Application Priority Data

Jul. 11, 2012 (CN) ...................... 2012 2 0333633 U

(51) Int. Cl.
*B60T 7/12* (2006.01)
*B25J 5/00* (2006.01)
*A47L 9/28* (2006.01)
*G05D 1/02* (2006.01)

(52) U.S. Cl.
CPC ................. *B25J 5/00* (2013.01); *A47L 9/2852* (2013.01); *A47L 9/2889* (2013.01); *G05D 1/021* (2013.01); *A47L 2201/04* (2013.01); *Y10S 901/01* (2013.01)
USPC ................... 180/169; 180/168; 701/22; 901/1

(58) Field of Classification Search
CPC ............ B62D 1/24; B62D 1/28; B62D 1/283; B60K 31/0008; B60R 21/0134; B60R 21/0136
USPC .......... 180/167, 169, 168; 701/1, 22; 700/245
See application file for complete search history.

(56) References Cited

U.S. PATENT DOCUMENTS

| 7,429,843 B2 | 9/2008 | Jones et al. |
| 8,508,329 B2 * | 8/2013 | Veenstra ........................ 340/1.1 |
| 2012/0084936 A1 * | 4/2012 | Li .................................. 15/319 |

FOREIGN PATENT DOCUMENTS

EP    2667223 A1 *  5/2012

* cited by examiner

*Primary Examiner* — John Walters
(74) *Attorney, Agent, or Firm* — Stites & Harbison PLLC; Cong Ding

(57) ABSTRACT

A fall-proof and anti-collision vacuum cleaner is disclosed in the present application, which comprises a main body, a driving device, a collision baffle and an elastic element. The collision baffle comprises a left side portion, a right portion and a middle portion for connecting the left portion and the right portion, at least one sensor is disposed on the outer edges of the left side, right side and middle portions respectively, the at least one sensor is electrically connected to the driving means, a plurality of shading parts are disposed on the main body corresponding to the positions of the sensors for sheltering the sensors, each of the sensors has three working positions, in the first working position, the sensors receive the feedback signals from the support below the main body, in the second working position, the sensors are sheltered by the shading parts, and in the third working position, the sensors fail to receive any signals within the sensing range thereof. The collision baffle of the invention has less movement track, improved sensitivity as well as the function of fall-proof.

15 Claims, 4 Drawing Sheets

FALL-PROOF AND ANTI-COLLISION VACUUM CLEANER

CROSS REFERENCE TO RELATED APPLICATIONS

This application claims priority to CN application no. CN201220333633.0 filed Jul. 11, 2012 under 35 U.S.C. 119 (a).

FIELD OF THE INVENTION

The present invention relates to a cleaner, more particularly to a fall-proof and anti-collision vacuum cleaner.

DESCRIPTION OF THE RELATED ART

In the conventional vacuum cleaner technology, a collision baffle is connected to the main body of a vacuum cleaner by means of a pivot, that is to say, the collision baffle is disposed rotatably around a central axis on the main body of the vacuum cleaner. In operation, the parts of the collision baffle located in the left side and right side portions of the main body of the vacuum cleaner can shelter the sensor after rotating over a certain distance, so that the sensor senses the barrier. The sensor is disposed on the main body of the vacuum cleaner, and the collision baffle shelters the sensor after colliding to achieve the purpose of sensing.

In the conventional vacuum cleaner technology, the collision baffle moves over a certain range to actuate the sensor sensing a barrier, therefore, the anti-collision sensitivity of such vacuum cleaners is lower relatively, and further, the sensor is disposed on the main body of the vacuum cleaner, namely the sensor is located within the vacuum cleaner, and thus the vacuum cleaner is without the function of fall-proof.

SUMMARY OF THE INVENTION

In order to overcome the above disadvantages, the present invention provides a fall-proof and anti-collision vacuum cleaner, which has the function of fall-proof and further improves the sensitivity of anti-collision.

In order to solve the above problems, a fall-proof and anti-collision vacuum cleaner is disclosed in the present invention, which comprises a main body, a driving device disposed on the main body for driving the movement of the vacuum cleaner, a collision baffle movably connected to the main body, and an elastic element arranged between the collision baffle and the main body for restoring the collision baffle to its initial position, wherein the collision baffle comprises a left side portion located in the left side of the main body, a right side portion located in the right side of the main body, and a middle portion for connecting the left side and right side portions, at least one sensor being disposed on the outer edges of the left side portion, right side portion and middle portion respectively, the at least one sensor being electrically connected to the driving device, a plurality of shading parts being disposed on the main body corresponding to the positions of the sensors for sheltering the sensors, each of the sensors having three working positions, in the first working position, the sensors receiving the feedback signals from the support below the main body, in the second working position, the sensors being sheltered by the shading parts, and in the third working position, the sensors failing to receive any signals within the sensing range thereof.

Preferably, an elastic element is arranged between the middle portion of the collision baffle and the main body, a slot being opened on the left side and right side portions of the collision baffle respectively, and a guiding post being disposed on the left and right sides of said main body respectively for sliding in the corresponding slots.

More preferably, the main body comprises an upper housing and a base disposed fixedly on the upper housing, at least one spring being arranged between the middle portion of the collision baffle and the base, a slot being opened on the left side and right side portions of the collision baffle respectively, and a guiding post being disposed on the left and right sides of the base respectively for sliding in the corresponding slots.

Still more preferably, the stretching direction of the at least one spring is parallel to the long axis direction of the slots.

Preferably, the main body comprises an upper housing and a base disposed fixedly on the upper housing, multiple torsional springs being arranged between the upper housing and the collision baffle, a slot being opened on the left side, right side and middle portions of the collision baffle respectively, and guiding posts being disposed on the upper housing for inserting into the corresponding slots.

More preferably, the long axes of the slots are in a same circumference.

Preferably, the number of the sensors is between 3 and 5.

Preferably, the sensors are arranged evenly on the outer edge of the collision baffle along a circumferential direction.

Preferably, the collision baffle is configured as an integrated construction.

More preferably, the plurality of shading parts of the main body are configured as an integrated construction. More preferably, when the vacuum cleaner in operation is upraised away from the support and the sensors disposed thereon cannot detect any signals within the sensing range thereof, the vacuum cleaner stops operating The present invention has the following advantages by means of utilizing the above structure:

1. In the present invention, a collision baffle is disposed movably on the main body of the vacuum cleaner by a spring or torsional spring, the collision baffle can rotate freely relatively according to the collision position, and thus the movement track is mobile. The sensor disposed on the collision baffle moves with the collision baffle after collision, and senses that the movement is hindered, thereby achieves the further operations such as backing off automatically. From this, it can be seen that the movement track of the collision baffle provided in the invention is less, and the sensitivity of the collision baffle is improved.

2. The sensor is disposed on the outer edge of the collision baffle, and thus located on the outer edge of the vacuum cleaner, when the sensor cannot detect any signals, the vacuum cleaner will stop moving automatically. Because the sensor is located on the outer edge of the main body, the main body of the vacuum cleaner remains located in the original supporting platform when no signals is detected, then the vacuum cleaner will back off automatically to prevent itself from falling. Additionally, when the vacuum cleaner in operation is upraised away from the support and the sensors disposed thereon cannot detect any signals within sensing range thereof, the vacuum cleaner stops operating, thus it is safe for the user to operate the vacuum cleaner at any time.

Wherein, 1. a main body; 11. an upper housing; 12. a base; 13. a shading part; 14, a guiding post; 2. a collision baffle; 21. a sensor; 22. a slot; 3. a spring; 4. a torsional spring.

DETAILED DESCRIPTION OF THE PREFERRED EMBODIMENTS

Preferred embodiments of the present invention will now be illustrated in more detail hereinafter with reference to the drawings, so that the advantages and features of the present invention can be easily understood for a person skilled in the art, and thus the extent of protection of the invention can be defined more clearly.

Figure 1:
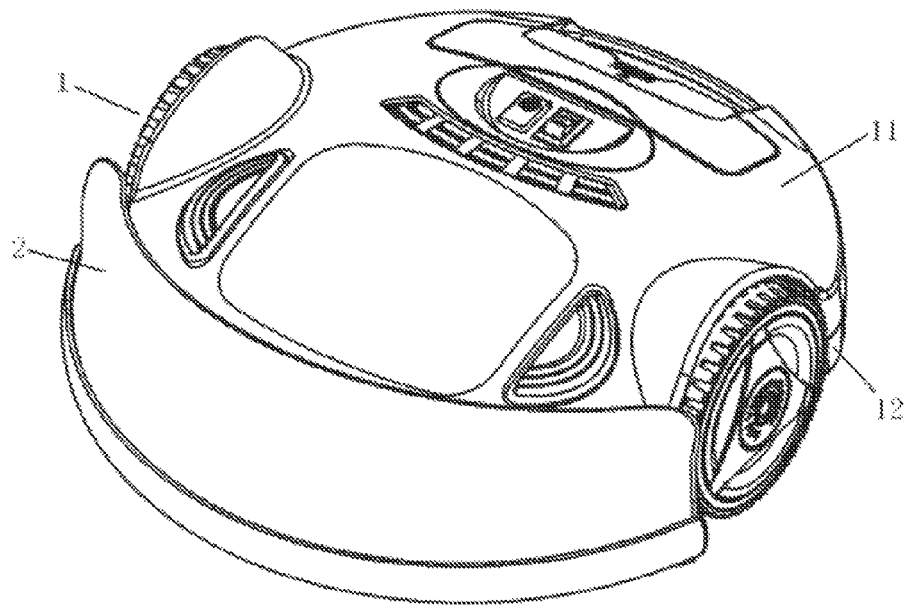
FIG. 1 is a perspective view of a first embodiment according to the invention.
Figure 2:
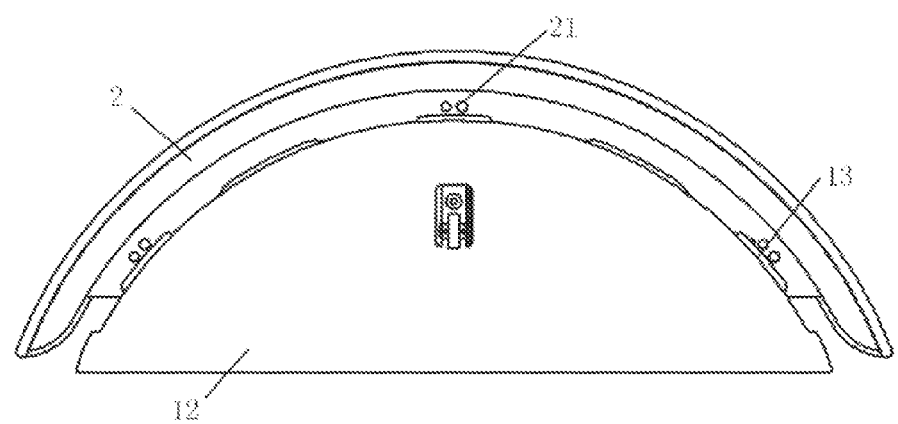
FIG. 2 is a partial bottom view of a first embodiment according to the invention.
Figure 3:
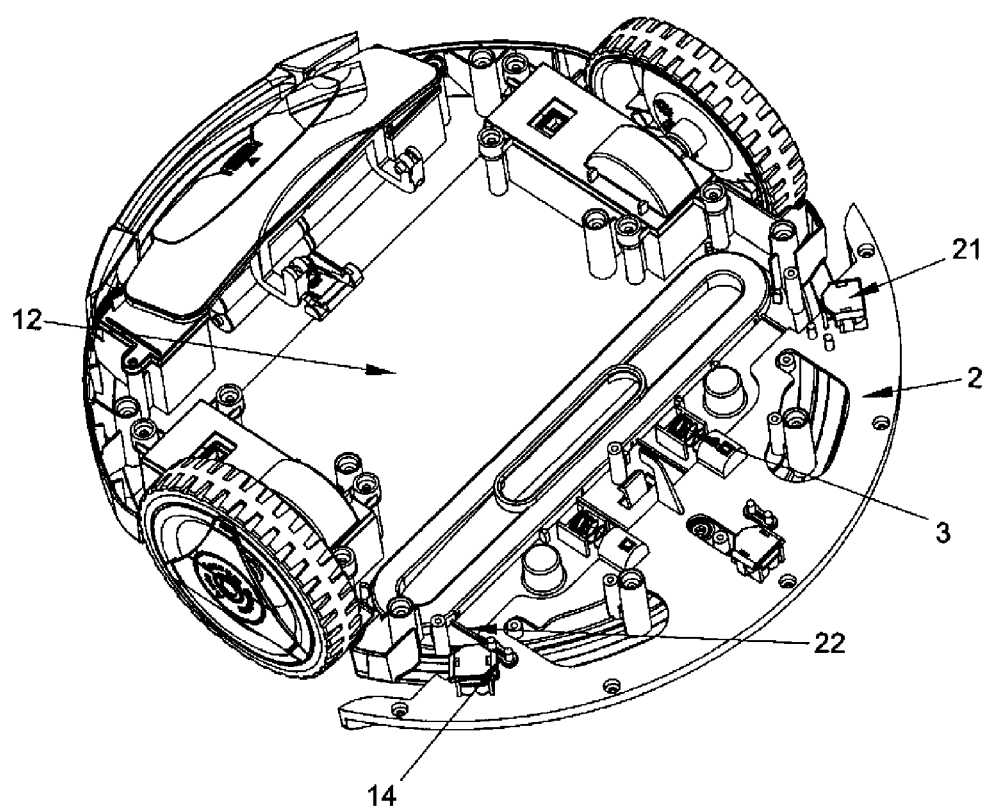
FIG. 3 is a second perspective view of a first embodiment according to the invention.

As shown in FIGS. 1-3, in the first embodiment of the invention:

FIG. 1 illustrates a fall-proof and anti-collision vacuum cleaner, which comprises a main body 1, a driving device disposed on the main body 1 for driving the movement of the vacuum cleaner, a collision baffle 2 which can move against the main body 1 of the vacuum cleaner, and an elastic element arranged between the collision baffle 2 and the main body 1 for restoring the collision baffle. Wherein the collision baffle 2 comprises a left side portion located in the left side of the main body 1, a right side portion located in the right side of the main body 1 and a middle portion for connecting the left side and right side portions, at least one sensor 21 is disposed on the outer edges of the left side portion, right side portion and middle portion respectively, the at least one sensor 21 is electrically connected to the driving device, and a plurality of shading parts 13 are disposed on the main body 1 corresponding to the positions of the sensors for sheltering the sensors.

During normal operation of a vacuum cleaner, the detectors of the sensors 21 face to ground or other supports below the vacuum cleaner, the vacuum cleaner is in the status of advancing. The collision baffle 2 moves towards the main body 1 of the vacuum cleaner when it collides with a wall or any other barriers, meanwhile, at least one of the sensors disposed on the left side, right side or middle portions will be sheltered by the shading parts 13 of the main body 1 of the vacuum cleaner below, thus, the driving device disposed on the main body 1 of the vacuum cleaner receives the signals sent from the sensor 21, and drives the vacuum cleaner in reverse or turning away to another direction instead of moving on.

As shown in FIGS. 2-3, a sensor 21 is disposed on the outer edges of the left side, right side and middle portions of the collision baffle 2 respectively, the vacuum cleaner will stop moving automatically when the detectors of the sensor fail to detect any signals. Because the sensor is located on the outer edge of the main body, the main body of the vacuum cleaner remains located in the original supporting platform, meanwhile, the driving device of the vacuum cleaner drives the vacuum cleaner in reverse, thereby preventing the vacuum cleaner from falling.

Preferably, the number of the sensors is between 3 and 5, the sensors 21 arranged evenly on the outer edge of the collision baffle along a circumferential direction.

Wherein, the left side, right side and middle portions of the collision baffle 2 may be configured as a paratactic linked structure, or an integrated construction.

Correspondingly, the multiple shading parts 13 of the main body 1 of the vacuum cleaner can be configured as an integrated construction, or disposed independently on the main body 1 of the vacuum cleaner with each other.

FIG. 3 shows a first embodiment of the invention, wherein springs 3 are disposed between the middle portion of the collision baffle and the main body 1 of the vacuum cleaner, a slot 22 is opened on the left side and right side portions of the collision baffle 2 respectively, and a guiding post 14 is disposed on the left and right sides of the main body respectively for sliding in the corresponding slots 22. The guiding posts 14 cause the collision baffle 2 sliding perpendicularly or aslant against the main body 1 of the vacuum cleaner, to draw close to or go away from the main body 1 of the vacuum cleaner. In this embodiment, both the number of the slots 22 and the number of the corresponding guiding posts 14 are two, however, it also would be appreciated that the extent protection of the present invention is not limited to the above number, but other numbers should be incorporated in the extent of protection.

The stretching direction of the springs 3 is parallel to the long axis direction of the slots 22.

Preferably, the main body 1 of the vacuum cleaner comprises an upper housing 11 and a base 12 disposed on the upper housing 11, the springs 3 are disposed between the middle portion of the collision baffle 2 and the base 12, a slot 22 is opened on the left side and right side portions of the collision baffle 2 is respectively, a guiding post 14 is disposed on the left side and right side of the base 12 respectively for sliding in the corresponding slots 22. The vacuum cleaner with such structure can be mounted or dismounted more easily.

When the collision baffle 2 collides with a barrier such as a wall, the guiding posts 14 slide in the slots 22, the springs 3 are compressed and drive at least one of the sensors 21 disposed on the collision baffle 2 close to the corresponding shading parts 13 on the main body 1 of the vacuum cleaner, until the at least one sensor 21 is triggered to cause the vacuum cleaner in reverse or change direction, and the position of the collision baffle 2 is restored under the action of counterforce of the springs 3.

In this embodiment, three sensors 21 are distributed evenly on the left side, middle and right side portions of the collision baffle 2.

By utilizing such structure, the collision baffle 2 can rotate freely relatively according to the collision location, and thus the movement track is mobile. The sensor disposed on the collision baffle 2 moves with the collision baffle after collision, and senses that the movement is hindered, thereby achieves further operations such as reverse automatically. From this, it can be seen that the movement track of the collision baffle 2 provided in the invention is less, and the sensitivity of the collision baffle is improved. Also, when the vacuum cleaner in operation is upraised away from the support and the sensors 21 disposed thereon cannot detect any signals within the sensing range thereof, the vacuum cleaner stops operating, and thus the vacuum cleaner is always safe for a user.

Figure 4:
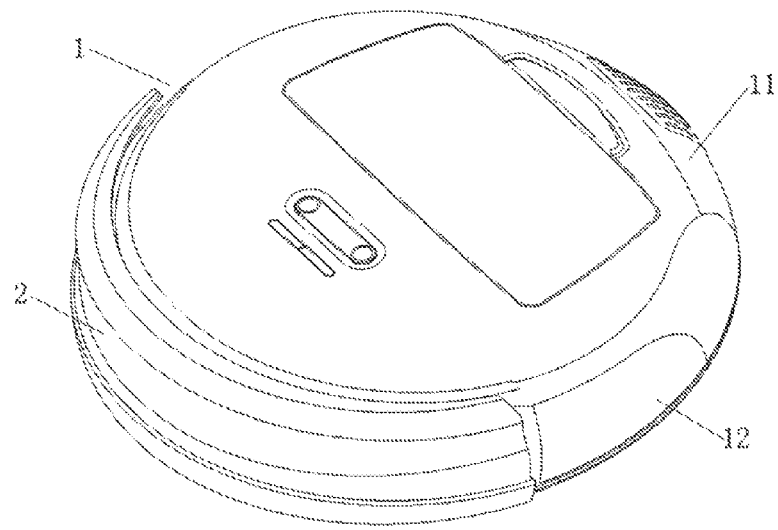
FIG. 4 is a perspective view of a second embodiment according to the invention.
Figure 5:
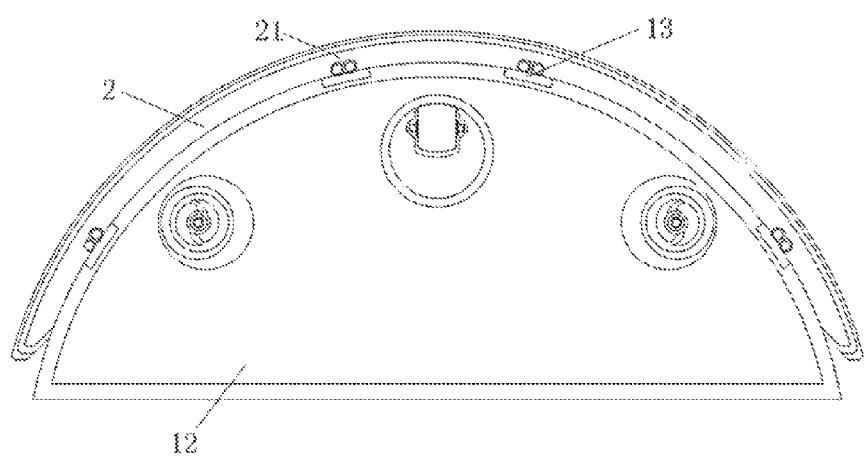
FIG. 5 is a partial bottom view of a second embodiment according to the invention.
Figure 6:
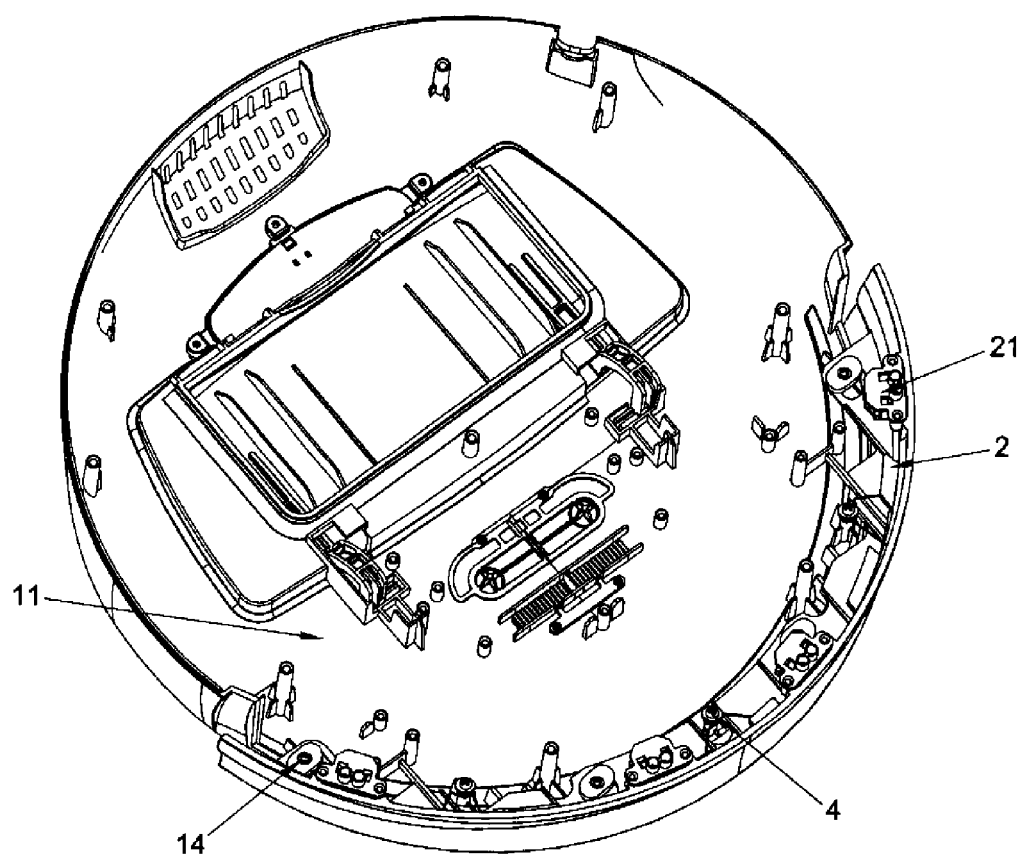
FIG. 6 is a second perspective view of a second embodiment according to the invention.

As shown in FIGS. 4-6, the second embodiment of the invention is distinct from the first embodiment in that the main body 1 of the vacuum cleaner comprises an upper housing 11 and a base 12 disposed on the upper housing 11, three torsional springs 4 are disposed between the upper housing 11 and the collision baffle 2, and the three torsional springs 4 are located on the left side, middle and right side portions respectively. A slot 22 is opened on the left side, middle and right side portions of the collision baffle 2 respectively, and the upper housing 11 is provided with guiding posts 14 for inserting into the slots 22.

As shown in FIG. 6, when the collision baffle 2 collides with a barrier such as a wall, one leg of each torsional spring 4 slides in the corresponding slot 22, meanwhile, the torsional springs 4 are compressed and drives at least one of the sensors 21 disposed on the collision baffle 2 close to the corresponding shading parts 13 on the main body 1 of the vacuum cleaner, until the at least one sensor 21 is triggered to cause the vacuum cleaner backing off or changing direction, and the position of the collision baffle 2 is restored under the action of counterforce of the torsional springs 4.

In such an embodiment, four sensors 21 are arranged on the collision baffle 2, with one on the left side portion, one on the right side portion and two on the middle portion, the slots 22 are arranged near to the sensors 21, and the guiding posts 14 cause the collision baffle 2 to slide perpendicularly or aslant against the main body 1 of the vacuum cleaner, to draw close to or go away from the main body 1 of the vacuum cleaner. In this embodiment, both the number of the slots 22 and the number of the corresponding guiding posts 14 are four, however, it is also would be appreciated that the extent protection of the present invention is not limited to the above numbers, the other numbers should be incorporated in the extent of protection.

It is to be noted, that the preferred embodiments described herein are only intended to illustrate the technical concept and features of the invention, the aim of which is to enable a person skilled in the art to understand and implement the content of the invention more easily, however, the extent of protection of the utility cannot be limited hereby, and all the equal variations or modifications according to the spirit of the invention would be covered within the protection scope of the invention.

The invention claimed is:

1. A drop-proof and anti-collision vacuum cleaner, comprising
   a main body (1);
   a driving device disposed on said main body (1) for the movement of the vacuum cleaner;
   a collision baffle (2) movably connected to the main body (1); and
   an elastic element arranged between the collision baffle (2) and the main body (1) for restoring the collision baffle (2);
   is characterized in that the collision baffle (2) comprises a left side portion located in the left side of the main body (1), a right side portion located in the right side of the main body (1) and a middle portion for connecting the left and right side portions, wherein at least one sensor being electrically connected to the driving device is disposed respectively on the outer edge of each of the left side portion, the right side portion and the middle portion, the at least one sensor, a plurality of shading parts (13) are disposed on the main body (1) corresponding to the sensors (21) for sheltering the sensors, each of the sensors having three working modes, comprising a first working mode where the sensors (21) receive feedback signals from an object below the main body (1) to support the main body (1), a second working mode where the sensors (21) are sheltered by the shading parts (13), and a third working mode where the sensors (21) fails to receive any signals within its the sensors' sensing range.

2. The vacuum cleaner as claimed in claim 1, wherein the elastic element is arranged between the middle portion of the collision baffle (2) and the main body (1).

3. The vacuum cleaner as claimed in claim 2, wherein the main body (1) comprises an upper housing (11) and a base (12) disposed fixedly on the upper housing (11), wherein the elastic element which is a spring (3) is arranged between the middle portion of the collision baffle and the base (12).

4. The vacuum cleaner as claimed in claim 1, wherein the main body (1) comprises an upper housing (11) and a base (12) disposed fixedly on the upper housing (11), wherein the elastic element which is a spring (3) is arranged between the middle portion of the collision baffle and the base (12).

5. The vacuum cleaner as claimed in claim 4, further comprises a slot (22) being opened respectively on each of the left and right side portions of the collision baffle (2), and a guiding post (14) being disposed respectively on each of the left and right sides of the base (12) for sliding in the corresponding slots (22).

6. The vacuum cleaner as claimed in claim 5, wherein the spring (3) stretches along the spring's (3) axis, wherein the slot (22) comprises a long axis, and wherein the stretching direction of the spring (3) is parallel to the long axis direction of each slot (22).

7. The vacuum cleaner as claimed in claim 5, wherein the long axes of the slots (22) intersect with a same circumference.

8. The vacuum cleaner as claimed in claim 1, further comprises a slot (22) being opened respectively on each of the left and right side portions of the collision baffle (2), and a guiding post (14) being disposed respectively on each of the left and right sides of the main body (1) for sliding in the corresponding slots (22).

9. The vacuum cleaner as claimed in claim 1, wherein the main body (1) comprises an upper housing (11) and a base (12) disposed fixedly on the upper housing (11), wherein the elastic element comprises a plurality of torsional springs being arranged between the upper housing (11) and the collision baffle (2).

10. The vacuum cleaner as claimed in claim 9, further comprises a slot (22) being opened respectively on each of the left side, right side and middle portions of the collision baffle, and guiding posts (14) being disposed on the upper housing (11) for inserting into the corresponding slots (22).

11. The vacuum cleaner as claimed in claim 1, wherein the number of the sensors (21) is from 3 to 5.

12. The vacuum cleaner as claimed in claim 1, wherein the sensors (21) are arranged evenly on the outer edge of the collision baffle (2) along a circumferential direction.

13. The vacuum cleaner as claimed in claim 1, wherein the collision baffle is configured as an integrated construction.

14. The vacuum cleaner as claimed in claim 1, wherein the plurality of shading parts (13) of the main body (1) are configured as an integrated construction.

15. The vacuum cleaner as claimed in claim 1, wherein when the vacuum cleaner in operation is upraised away from the object below the main body and the sensors are in the third working mode the vacuum cleaner stops operating.

* * * * *